United States Patent [19]
Townsend

[11] 3,967,599
[45] *July 6, 1976

[54] ROTARY INTERNAL COMBUSTION ENGINE AND METHOD OF COOLING THE SAME

[75] Inventor: Ray T. Townsend, Des Moines, Iowa

[73] Assignee: Townsend Engineering Company, Des Moines, Iowa

[ * ] Notice: The portion of the term of this patent subsequent to Aug. 13, 1991, has been disclaimed.

[22] Filed: July 15, 1974

[21] Appl. No.: 488,781

Related U.S. Application Data

[63] Continuation of Ser. No. 351,606, April 16, 1973, Pat. No. 3,828,740, and a continuation-in-part of Ser. No. 286,189, Sept. 5, 1972, abandoned.

[52] U.S. Cl. .............................. 123/44 D; 123/44 E
[51] Int. Cl.² .......................................... F02B 57/00
[58] Field of Search ............... 123/44 D, 44 E, 8.11, 123/41.6, 43 C

[56] References Cited
UNITED STATES PATENTS

| | | | |
|---|---|---|---|
| 1,264,580 | 4/1918 | Tacchi.............................. | 123/44 B |
| 2,209,996 | 8/1940 | Neuland............................ | 123/41.6 |
| 2,707,461 | 5/1955 | Smith ................................ | 123/44 E |
| 3,828,740 | 8/1974 | Townsend ......................... | 123/44 E |

*Primary Examiner*—Carlton R. Croyle
*Assistant Examiner*—Thomas I. Ross
*Attorney, Agent, or Firm*—Zarley, McKee, Thomte & Voorhees

[57] ABSTRACT

A rotary internal combustion engine is disclosed and generally comprises a rotor means which is rotatably mounted on a stationary core mounted in an engine frame. The rotor means has a plurality of cylinders spaced radially thereon. A free floating piston is slidably mounted in each of the cylinders with the heads of the pistons being positioned towards the center of the rotor. A roller is mounted in the skirt end of the piston which rides against a circular cam. The centrifugal force created by the rotation of the rotor causes the pistons to follow the internal cam surface of the cam during rotation. The inner end of the core is provided with fuel and air ports adapted to communicate with the cylinders as the rotor rotates with respect to the core. An air passageway is formed in the core and is in communication with the air port and an air pump to provide a supply of air for purging, cooling and charging the cylinders. A fuel passageway is provided in the core and is in communication with the fuel ports and a supply of fuel to supply fuel under pressure to the fuel ports. An adjustable needle valve is provided in the fuel passageway to permit the precise adjustment or metering of the fuel being supplied to the fuel ports. Ignition is accomplished through compression with the cam being shaped so that the compression is increased as the piston approaches its position of maximum compression. The cam is shaped to provide a dwell adjacent the area of maximum compression to permit the piston to be maintained at the position of partial expansion to permit complete combustion of the fuel-air mixture to increase combustion efficiency. The cylinders are exhausted by means of opening extending around the cylinder. The exhaust from each cylinder is exhausted through its individual exhaust opening with the exhaust in the cylinder being purged by the air being supplied thereto from the air pump. The air also permits the cylinders to be recharged and forces the pistons radially outwardly into engagement with the cam. The air also cools the inside surface of the cylinder. The preferred embodiment includes an even number of cylinders, ordinarily two or four with a cam plate having a pair of oppositely disposed lobes. The preferred cam plate is designed to condense the compression stroke and the expansion stroke into a shorter period of time so that less heat is lost to the walls of the cylinder therefore requiring less cooling. The shortened compression and expansion time also permits additional time for the cooling cycle.

2 Claims, 20 Drawing Figures

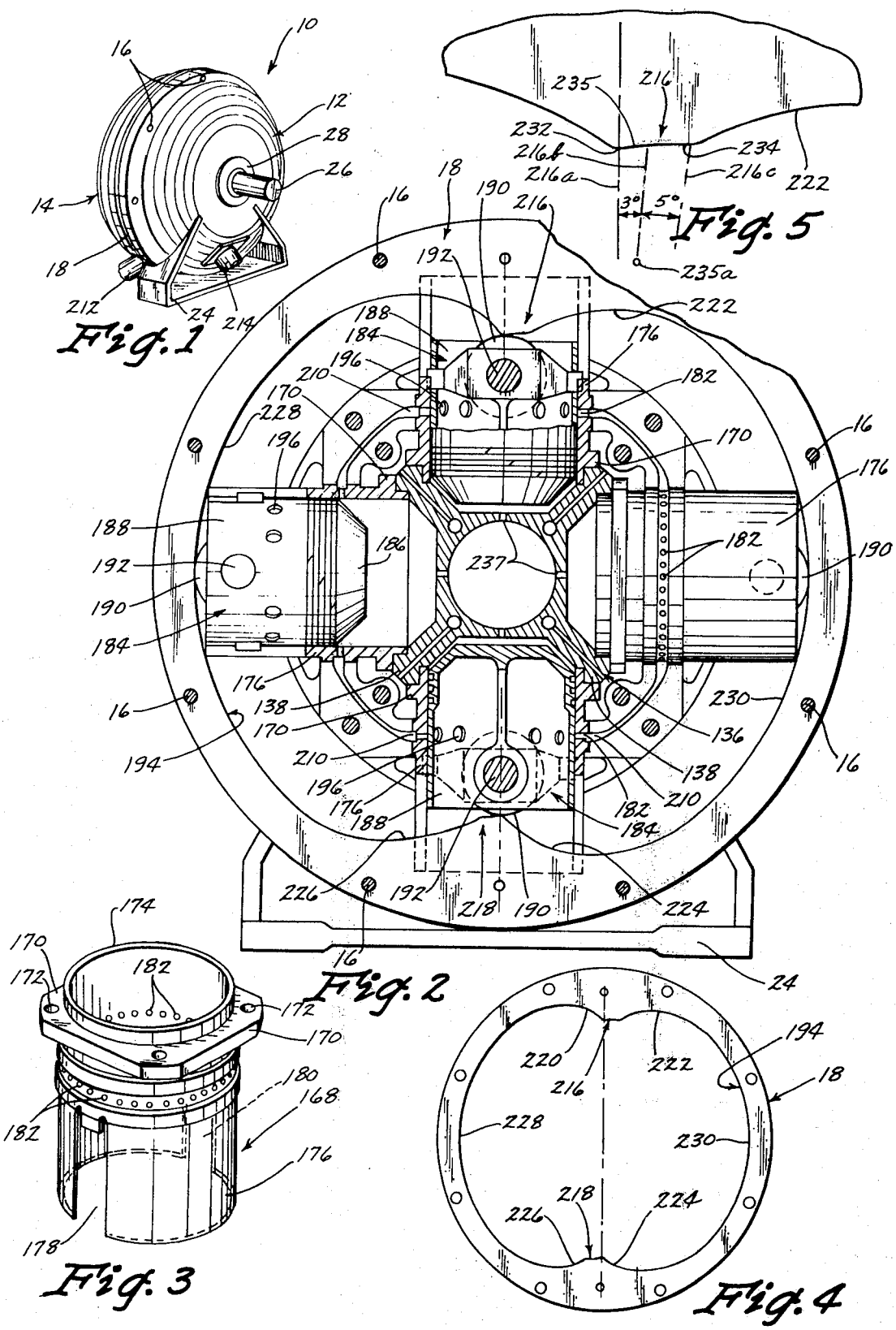

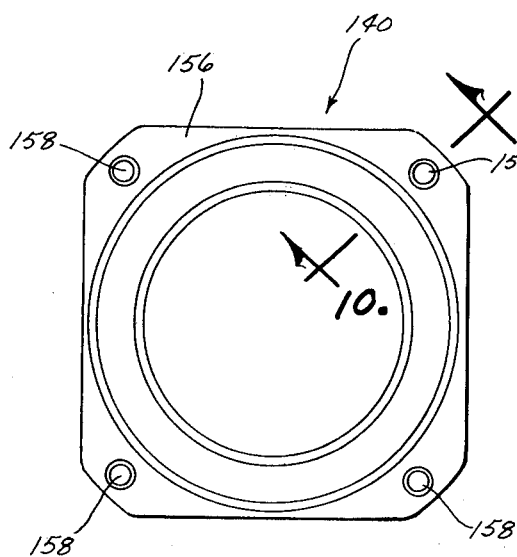
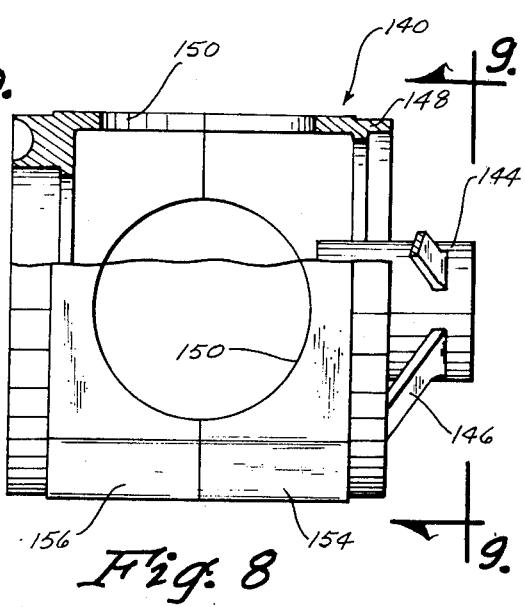
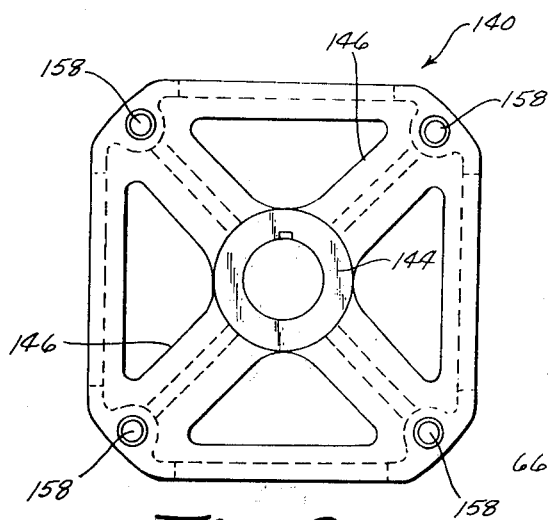
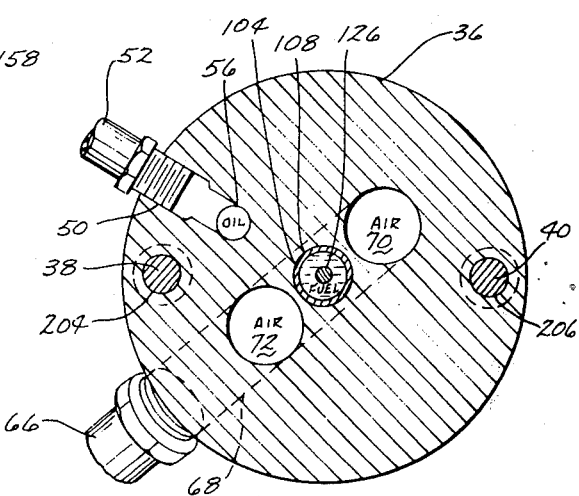
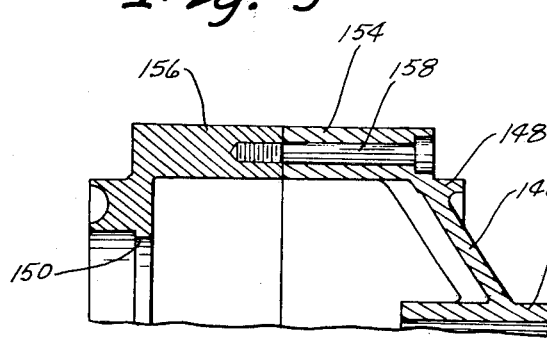
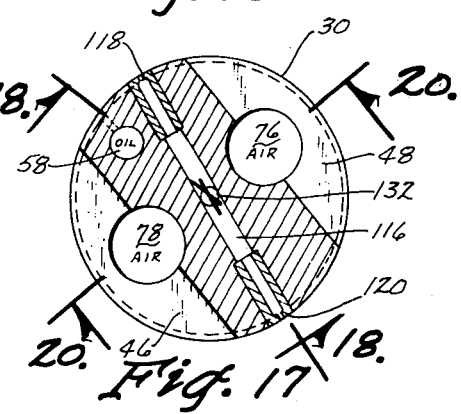

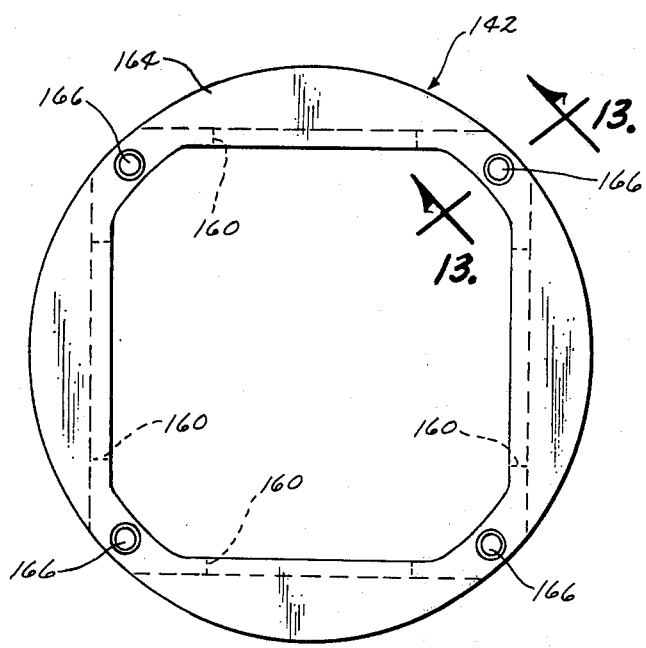
Fig. 11
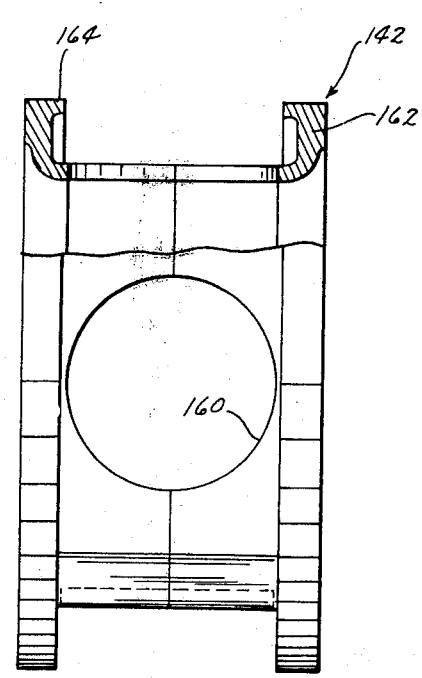
Fig. 12
Fig. 13
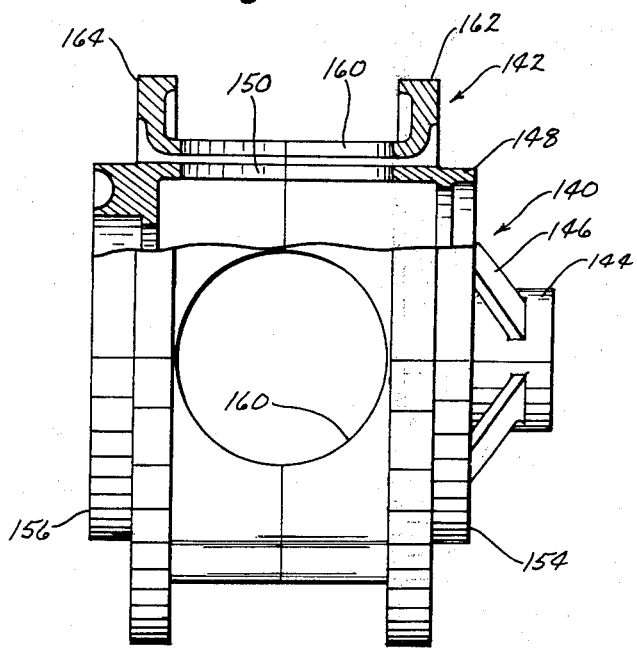
Fig. 14

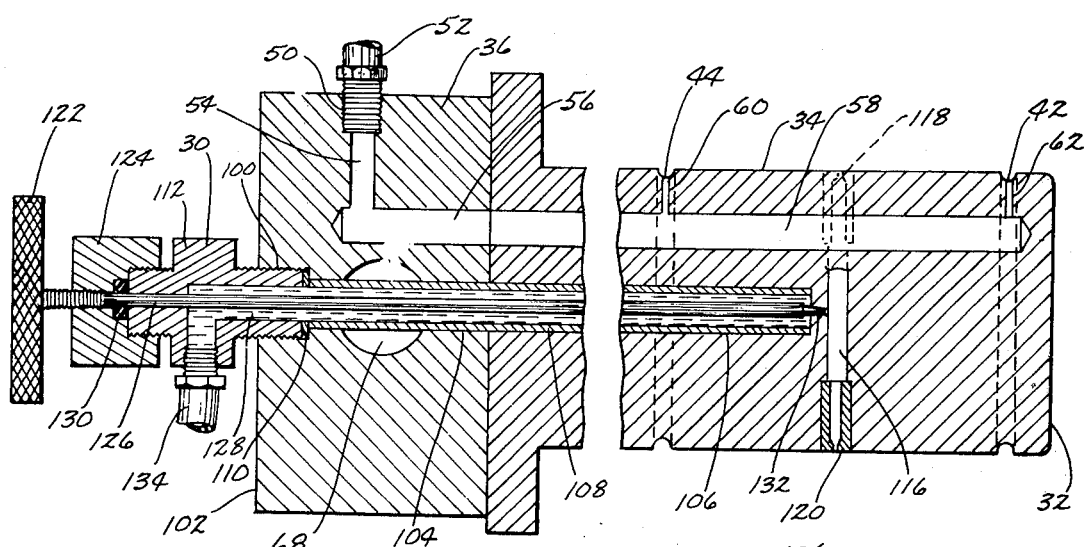
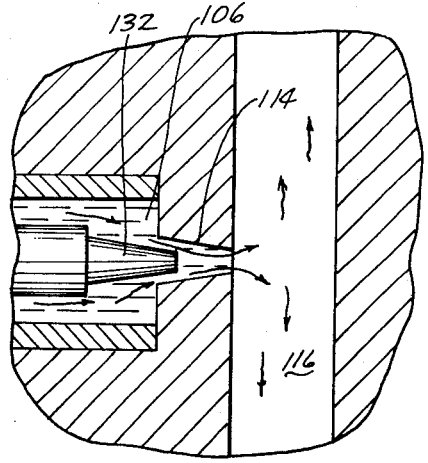
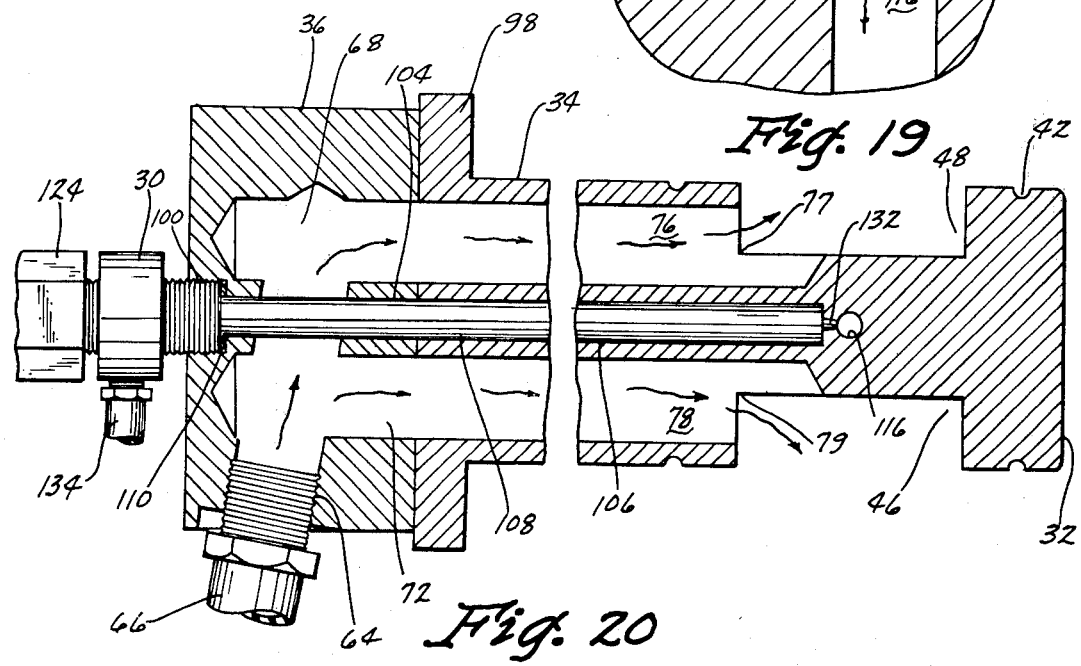

ROTARY INTERNAL COMBUSTION ENGINE AND METHOD OF COOLING THE SAME

BACKGROUND OF THE INVENTION

This application is a continuation of co-pending application Ser. No. 351,606 filed Apr. 16, 1973 now U.S. Pat. No. 3,828,740, said application being a continuation-in-part application of co-pending applications Ser. No. 286,189, filed Sept. 5, 1972 now abandoned in favor of continuation of application Ser. No. 538,106, filed Jan. 2, 1975 and Ser. No. 301,096, filed Oct. 26, 1972 now U.S. Pat. No. 3,857,372.

In the usual internal combustion engines, the heat generated by the explosion is partly dissipated or conducted into the walls of the surrounding metals, and as it is conducted through the walls, it is radiated off to the air from fins on the outer surface of the cylinders, or is conducted into a liquid coolant in a jacket around the cylinders.

In rotary internal combustion engines of the cam type, the rollers of the pistons are forced outwardly into engagement with the cam plates so that the rollers will follow the shape of the cam plate. Frequently, the centrifugal force is not enough to overcome the vacuum effect when the pistons are required to suck in their charge of air in conventional fashion.

In a conventional engine of either the compression or spark ignition type, there is a problem of detonation and/or pre-ignition caused by the sudden pressure and temperature rise immediately after ignition while the crank is still near the top center where there is very little volume into which the gas can expand. To cope with this problem, a combustion deterrent such as lead has been used to slow the burning of the fuel, or the fuel has been slowly injected into the cylinder as in diesel engines so that the combustion will take place slowly as the piston expands down into the cylinder. This solution requires very careful timing and control and it is inefficient since some of the burning is retarded until the piston has been considerably moved towards an expanded position.

Conventional rotary internal combustion engines have experienced some problems in the manner of sealing the respective cylinders, air ports, gas ports, etc. Elaborate sealing mechanisms have been attempted but the problem is largely unsolved. A further problem existing in existing rotary internal combustion engines is in supplying air and fuel to the respective cylinders at the proper time in an eficient manner.

Therefore, a principal object of the invention is to provide an unique method and means of cooling an internal combustion engine.

A further object of the invention is to provide a rotary internal combustion engine in which the exhaust is passed out of the individual cylinders instead of through a common valve port.

A further object of the invention is to provide a method and means for preventing excessive pressure and temperature from occurring in the cylinders during combustion.

A further object of the invention is to provide a rotary internal combustion engine wherein the pistons are maintained in a partially expanded position immediately after maximum compression to permit complete combustion without excessive pressures and temperatures being experienced.

A further object of the invention is to provide a rotary internal combustion engine comprising a stationary core having the rotor rotatably mounted thereon.

A further object of the invention is to provide a rotary internal combustion engine including means for supplying air thereto for purging, cooling and recharging the cylinders.

A further object of the invention is to provide a rotary internal combustion engine wherein air under pressure is employed to force the pistons outwardly into engagement with the cam plate.

A further object of the invention is to provide a rotary internal combustion engine having improved efficiency.

A further object of the invention is to provide a rotary internal combustion engine which is economical to manufacture and durable in use.

These and other objects will be apparent to those skilled in the art.

SUMMARY OF THE INVENTION

In the instant invention, a stationary core is provided in the engine frame upon which the rotor rotates. A plurality of radially spaced cylinders are mounted on the rotor with a piston being movably mounted in each of the cylinders. A cam plate is provided on the frame and has a cam surface thereon which is engaged by the rollers secured to each of the pistons so that the pistons will be moved between positions of compression and expansion as the rotor is being rotated with respect to the core. A rotatable shaft is secured to the rotor and extends outwardly from the frame.

A fuel passageway extends through the core for supplying fuel to the respective cylinders. A needle valve is positioned in the fuel passageway to permit the precise control of the fuel being supplied to the cylinders. An air passageway extends through the core for supplying air to the cylinders for charging, cooling and purging the cylinders. An oil passageway extends through the core for supplying oil to a pair of spaced apart annular grooves formed in the periphery of the core to provide a seal between the core and the rotor. The oil also serves to lubricate the rotor and core.

The preferred embodiment of the cam plate comprises a pair of lobes positioned 180° apart on the cam plate. A slightly curved cam surface is provided on each of the lobes adjacent the position of maximum compression so that the pistons may partially move to an expanded position immediately after the point of maximum compression to achieve substantially complete combustion without causing excessive pressure and temperature within the cylinder.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the engine of this invention;

FIG. 2 is an enlarged sectional view seen along lines 2 — 2 of FIG. 1 with portions thereof cut-away to more fully illustrate the invention:

FIG. 3 is a perspective view of one of the cylinders of the engine:

FIG. 4 is a plan view of the cam plate employed in the engine:

FIG. 5 is an enlarged partial plan view of the cam plate of FIG. 4:

FIG. 7 is an end view of one of the rotor members:

FIG. 8 is a partial top view of the rotor of FIG. 7:

FIG. 9 is an end view of the rotor member as seen along lines 9 — 9 of FIG. 8:

FIG. 10 is an enlarged sectional view seen along lines 10 — 10 of FIG. 7:

FIG. 11 is a plan view of another of the rotor members:

FIG. 12 is an end view of the rotor member of FIG. 11:

FIG. 13 is an enlarged sectional view seen along lines 13 — 13 of FIG. 11:

FIG. 14 is a top view of the rotor members with portions thereof cutaway to more fully illustrate the invention:

FIG. 16 is an enlarged sectional view seen along lines 16 — 16 of FIG. 15:

FIG. 17 is an enlarged sectional view seen along lines 17 — 17 of FIG. 15:

FIG. 18 is an enlarged partial sectional view seen along lines 18 — 18 of FIG. 17:

FIG. 19 is an enlarged partial sectional view seen along lines 18 — 18 of FIG. 17; and FIG. 20 is an enlarged sectional view seen along lines 20 — 20 of FIG. 17.

DESCRIPTION OF THE PREFERRED EMBODIMENTS

Figure 6:
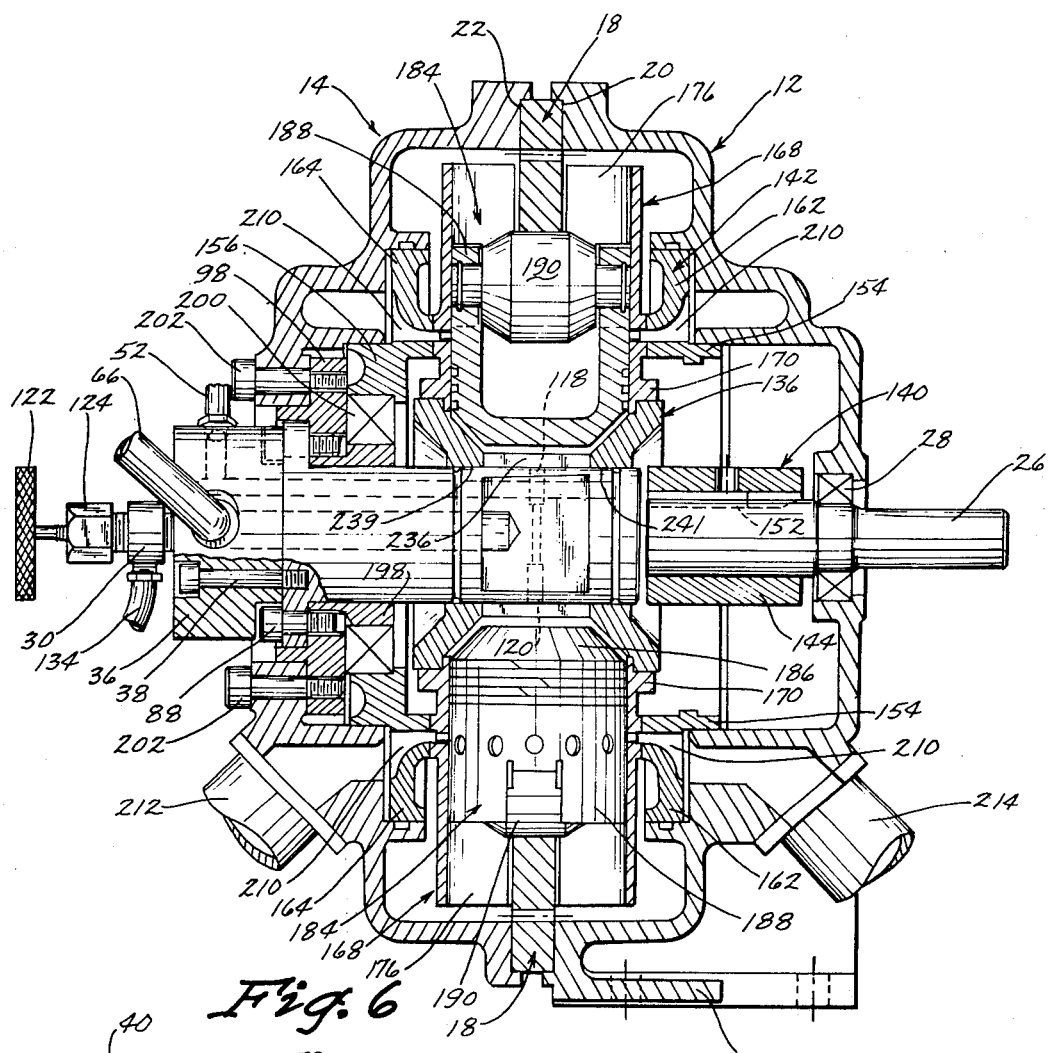
FIG. 6 is a sectional view of the engine as would be seen along lines transverse to the sectional view of FIG. 2.

The engine of this invention is designated by the reference numeral 10 and generally comprises engine frames 12 and 14 secured together by bolts 16 or other suitable means as seen in FIGS. 1 and 2. As shown in FIG. 1, a circular cam plate 18 is positioned between the frames 12 and 14 with the bolts 16 extending therethrough. Cam plate 18 is positioned with respect to the peripheral edges of frames 12 and 14 by the annular recesses 20 and 22 formed therein respectively (FIG. 6). Frame 12 includes a bracket portion 24 extending therefrom for mounting the engine.

Figure 15:
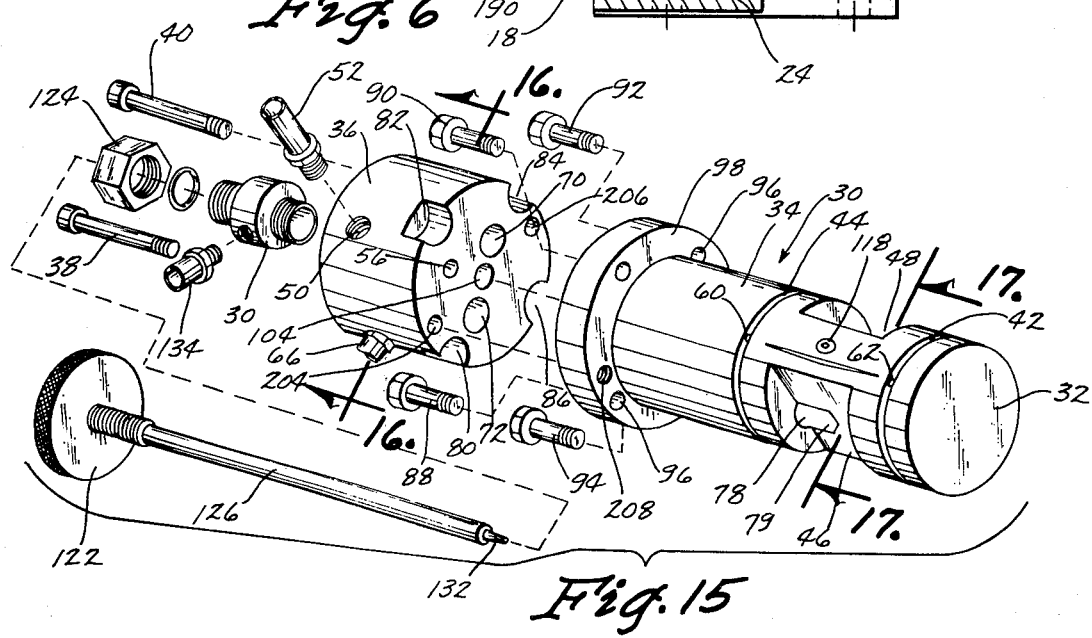
FIG. 15 is an exploded perspective view of the core of the engine.

Drive or rotor shaft 26 rotatably extends inwardly through the frame 12 and is supported therein by a main bearing 28. The numeral 30 refers generally to a core which extends through frame 14 into engine 10 so that its inner end 32 is positioned closely adjacent the inner end of the shaft 26. Core 30 is comprised of core members 34 and 36 which are secured together by a pair of bolts 38 and 40. Core member 34 is provided with a pair of spaced apart annular oil grooves 42 and 44 formed in the peripheral surface thereof as seen in FIG. 15. A pair of cut-away areas or notches 46 and 48 are also formed in core member 34 on opposite sides thereof as also seen in FIG. 15.

Core member 36 is provided with an internally threaded port 50 having an oil fitting or conduit 52 mounted therein. Port 50 communicates with a bore 54 extending radially inwardly therefrom as seen in FIG. 18. The inner end of bore 54 communicates with a longitudinally extending bore 56 which communicates with a longitudinally extending bore 58 formed in core member 34. A radially extending oil passageway 60 extends from bore 58 and communicates with oil groove 44. An oil passageway 62 extends from bore 58 and communicates with the oil groove 42. Oil under pressure is supplied through the oil conduit 52 so that oil will be supplied to the oil grooves 42 and 44 to lubricate the rotor which is rotatably mounted thereon as will be explained in more detail hereinafter. The oil in the grooves 42 and 44 also serves to provide a seal between the rotor and the core as also will be described hereinafter.

Core member 36 is provided with an internally threaded port 64 having an air line 66 threadably mounted therein. Air line 66 is in communication with a source of air under pressure. Port 64 communicates with an air compartment 68 having a pair of spaced apart air passageways or bores 70 and 72 extending longitudinally therefrom. Core member 34 is provided with a pair of elongated air passageways or bores 76 and 78 which communicate with the bores 70 and 72. As seen in FIG. 20, the inner ends of the bores 76 and 78 communicate with the notches 48 and 46 respectively to provide air ports 77 and 79 respectively. As seen in FIG. 15, four notches, 80, 82, 84 and 86 are formed in the exterior surface of core member 36 adjacent the inner end thereof which are adapted to receive the head portion of the bolts 88, 90, 92 and 94 respectively which extend through openings 96 formed in the flange portion 98 of core member 34.

An internally threaded bore 100 is formed in the outer end 102 of core member 36. An elongated bore 104 extends longitudinally through the core member 36 from the inner end of the bore 100 and communicates with an elongated longitudinally extending bore 106 formed in core member 34. The numeral 108 refers to an elongated metal tube which is positioned in the bores 104 and 106 as seen in FIG. 18. Tube 108 is provided with a flat head portion 110 which engages the inner end of a fitting 112 threadably mounted in the bore 100. A tapered valve seat or opening 114 is provided in the core member 36 at the inner end of bore 106 which communicates with a transversely extending bore or passageway 116. Bore 116 extends radially outwardly to the periphery of core member 34 and has a pair of replaceable fuel jets 118 and 120 mounted in the outer ends thereof respectfully.

The numeral 122 refers to a manually adjustable needle valve which is threadably mounted in the collar 124 which is threadably secured to the outer end of the fitting 112. Needle valve 122 rotatably extends through a bore 126 formed in fitting 112, through bore 128 formed in fitting 112 and through the elongated tube 106. Suitable seal means 130 embraces the needle valve 122 as also illustrated in FIG. 18. The inner end of needle valve 122 is provided with a tapered head portion 132 which is complementary to the valve seat 114 to permit the valve seat 114 to be selectively opened and closed through the rotational movement of the needle valve 122. Fuel line 134 is threadably connected to the fitting 112 and communicates with the bore 128 to supply fuel thereto and to the interior of the tube 106, valve seat 114 and bore 116. Fuel line 134 is in communication with a source of suitable fuel under pressure.

The numeral 136 refers to a rotor means rotatably mounted on core member 34 and comprising rotor members 138, 140 and 142. Rotor member 140 comprises a hub portion 144 and spokes 146 which extend radially outwardly therefrom to a rim portion 148. Rim portion 148 is provided with four circular openings 150 formed therein. Hub portion 144 is secured to shaft 126 by any suitable means such as a key 152 or the like. Rim portion 148 is comprised of rim members 154 and 156 held together by bolts 158. Rotor member 142 embraces rotor member 140 and has four circular openings 160 formed therein which register with the openings 150 in rotor member 140. Rotor member 142 comprises a pair of members 162 and 164 secured together by bolts 166. The numeral 168 refers to a cylinder which is mounted in each of the openings 160 and having a flange portion 170 engaging rotor member 138 as illustrated in FIG. 6. Each of the cylinders 168 is secured to the rotor member 138 by means of screws or the like extending through the openings 172 formed in flange 170 and being received by the rotor member 138.

Each of the cylinders 168 generally comprises an inner end portion 174 and a skirt portion 176. Skirt portion 176 is provided with opposing slots 178 and 180 formed therein and a plurality of exhaust openings 182 which extend through the cylinder around the circumference thereof. A piston 184 is slidably mounted in each of the cylinders 168 and generally comprises a head portion 186 and a skirt portion 188. A roller 190 is mounted on shaft 192 which is secured to akirt portion 188. Roller 190 rolls upon the cam surface 194 of the cam plate 18 to cause the piston to move with respect to the cylinder as the rotor of the engine rotates. The configuration of the cam plate will be explained in more detail hereinafter. Each of the pistons is provided with a plurality of openings 196 formed in the skirt portion and extending therethrough.

The numeral 198 refers to a bushing which embraces core member 34 and which supports a bearing 200. As seen in FIG. 6, the rim portion 156 of rotor member 144 engages and is supported by the bearing 200. The inner ends of bolts 88, 90, 92 and 94 are threadably secured to the bushing 198 as also illustrated in FIG. 6. Bolts 202 extend through frame 14 and are threadably secured to the bushing 198. Bolts 38 and 40 extend through the openings 204 and 206 of core member 36 and are threadably received by the threaded openings 208 in flange 98 of core member 34.

An exhaust chamber 210 is provided in the engine and extends around each of the cylinders as illustrated in FIG. 6. The exhaust chamber 210 is in communication with a pair of exhaust pipes 212 and 214. The exhaust chamber 210 is in communication with the exhaust openings 182 in the cylinders 168.

Cam surface 194 of cam plate 18 includes oppositely disposed lobes 216 and 218. Each of the lobes are provided with "dwell" area as will be explained in more detail hereinafter. For purposes of description, the cam surfaces closely adjacent the opposite sides of lobe 216 will be indicated by the reference numerals 220 and 222 respectively. The cam surfaces closely adjacent the opposite sides of lobe 218 will be indicated by the reference numerals 224 and 226 respectively. The cam surface approximate midway between 226 and 220 will be referred to by the reference numeral 228 while the cam surface approximately midway between 222 and 224 will be referred to by the reference numeral 230.

FIG. 5 illustrates lobe 216 in somewhat greater detail. The maximum projecting portion of lobe 216 will be referred to by the reference numeral 232. The engagement of the piston roller with 232 causes the piston to be moved inwardly with respect to its cylinder to achieve maximum compression at the top center. As seen in FIG. 5, the lobe 216 is provided with a "dwell" portion 234 which has a radius measured from the geometric center or cam plate 18, whereupon the piston will be maintained in a stationary position. Portion 234 spans a distance of about 5° and has a typical radius of 4.75 inches. Cam portion 236 connects the maximum projecting portion 232 with portion 234. Portion 235 spans a distance of 3° and has a typical radius of 1 inch. Portion 235 permits the piston to be moved slightly to an expanded position for a period after maximum compression as will be explained in more detail hereinafter. Inasmuch as lobes 216 and 218 are identical, lobe 218 will not be described in detail. The lines 216a, 216b and 216c are radius lines extending from the geometric center of the cam plate 18. Lines 216a and 216b span 3° and define cam portion 235. Lines 216b and 216c span 5° and define cam portion 234. The center 235a of the arc of portion 235 appears on line 216b.

In operation, fuel under pressure is constantly supplied to the interior of the tube 106 and the bore 116. The only time that fuel will pass from the jets 118 and 120 is when the jets communicate with the open inner ends of the cylinders 168 by way of the ports 237 formed in rotor member 138. When the fuel jets 118 and 120 do communicate with the cylinders 168, fuel will be sprayed into the interior of the cylinders. Air under pressure is constantly supplied to the air chamber 68 so that air will be discharged from the inner ends of bores 76 and 78 (ports 77 and 79) when the notches 46 and 48 communicate with the interiors of the respective cylinders through the ports 237 as the rotor is being rotated around the stationary core 30. Oil under pressure is also supplied to the oil grooves 42 and 44 as previously described so that lubricating oil is provided between the inside surface of the annular shoulders 239 and 241 of rotor element 138 and the exterior surface of core member 34. The film of oil between the core member 34 and the rotor member 138 also serves to seal the ports 237 with respect to the area outwardly of the rotor.

FIG. 2 illustrates the top and bottom pistons in firing positions. In the position of FIG. 2, the rollers on the pistons are on the top dead center areas 232 of the lobes 216 and 218 respectively. Inasmuch as the operation of the top piston is identical to the operation of the bottom piston (FIG. 2), only the operation or cycles of the top piston will be described. Assuming that the air and fuel have been supplied to the interior of the cylinder, the shape of the cam compresses the fuel and air mixture to the maximum compression ratio at top dead center, at which time ignition is started. Before the pressure in the cylinder can build up beyond desired limits, the piston is permitted to expand slightly to its dwell position (234) and is held in the same relative position of expansion until combustion has been completed. During the dwell period, the combustion builds the pressure up to the maximum pressure possible with consumption of the total charge but the pressure is not above desired limits because the volume of the combustion chamber has been predetermined by the dwell in the cam. After complete combustion and substantially all of the chemical energy of the fuel has been converted to heat, the piston is allowed to expand and to convert that heat energy into mechanical energy, or torque, but not until all of the combustion is complete and the entire force of the combustion is available at the beginning of the expansion stroke, after the dwell.

The slight dwell after top dead center provides many advantages. First, it eliminates the possibility of peak pressures rising too high because as long as the ignition timing is late enough to allow the piston to expand to its dwell volume, the combustion can never build up to a pressure higher than is possible in that dwell volume. Secondly, the accuracy necessary for ignition timing is much less because within extreme limits, it is only necessary to time the ignition late enough to allow the piston to get to its dwell position ahead of the combustion. If the ignition is later than desired and the piston gets to its dwell position farther ahead of the ignition than is necessary, there is no great loss because the combustion will catch up while the piston is dwelling. The third advantage is the rate of burning. Inasmuch as the engine can be timed late to eliminate detonation, it is now possible to use a fast burning fuel mixture with no lead or combustion deterrents. Since the combustion is taking place in a chamber which is large enough to contain the entire expanded charge at a satisfactory pressure, there is no reason to delay combustion thereby permitting the use of a fuel in a volatized condition as well as a lead free and pollutant free fuel.

The fact that the engine provides fast burning without excessive pressures and detonation makes it possible to use a high air-to-fuel ratio as well as volatized fuel in order to get complete combustion to eliminate carbon monoxide and unburned hydrocarbons. Additionally, since the pressure and temperature in the combustion chamber is limited, the excessive high temperatures which produce oxides of nitrogen are avoided. The efficiency of the engine is also improved because of the advantage that the completely expanded gas at the top of the expansion stroke is utilized throughout the full length of the expansion stroke instead of retarding part of the combustion until the piston has moved to a position of partial expansion. In summary, the shape of the cam permits a maximum compression at top center to provide ignition temperatures. The piston is then permitted to slightly move towards expansion to a position of dwell at which the combustion chamber is large enough to contain the total consumed charge without exceeding a desired maximum pressure. The position of dwell is maintained until combustion is substantially complete before expansion movement of the piston is continued to complete expansion and exhaust. The exact timing of the ignition is controlled by the point at which the fuel is injected similar to a conventional diesel, but the ignition it timed late enough to allow the piston to reach the dwell position ahead of the combustion pressure build-up.

Assuming that combustion has occurred and that the piston has moved past the dwell area, the piston begins to move outwardly towards a position of expansion with respect to the cylinder so that the roller moves from the dwell portion of the cam plate onto the cam surface indicated by 222 with the expansion movement of the piston causing the rotor 136 and shaft 26 to be rotated. The curvature or sweep of the cam surface at 222 is such that the piston is allowed to move towards a position of expansion at a comparatively rapid rate after the dwell and after substantially complete combustion. The piston continues to expand due to the combustion forces on the head thereof until the head of the piston has moved past the exhaust openings 182 in the cylinder to permit the exhaust gases to be exhausted outwardly therethrough. Such exhausting occurs with regard to the cam plate at approximately 230.

As previously stated, air under pressure is constantly being supplied to the notches 46 and 48 to permit air to be forced into the cylinders when the notches 46 and 48 communicate therewith through the ports 237 during the rotation of the rotor and cylinders. The air under pressure is forced into the cylinder which aids in scavenging the exhaust gases from the cylinders when the top of the piston has been moved below the openings 182. The dwell of the piston at the bottom of the stroke (230) is easily modified by the shape of the cam, and the time involved is at least 50% or more of the total time of a conventional 4-stroke cycle. During that entire time, ambient air from the air blower is being forced through the cylinder and out the exhaust holes 182 in the side of the cylinder. The air not only scavenges the exhaust from the cylinder but aids in cooling the engine as well as recharging the cylinder for the next cycle. The volume of air passing outwardly through the openings 182 is not nearly as much as is needed to cool a cylinder from its outside surface. However, the inside surface temperature of the cylinder (300° to 500°) is far higher than the outside surface of the cylinder, and therefore the heat transfer rate between the inside cylinder surface and the air is much faster than would be possible when cooling the cylinder from the outside. Therefore, it has been found that a lesser amount of air on the inside of the cylinder is quite adequate because of the greater temperature difference and its faster cooling rate. Furthermore, since the pistons are controlled by the shape of a cam, it is a simple matter to allow the compression stroke, and especially the expansion stroke, to be condensed into a shorter period of time so that less heat is lost into the walls of the cylinder therefore requiring less cooling. Further, as the compression and expansion time is shortened, more time is allowed for the cooling cycle.

The forcing of the air into the cylinders also achieves an additional result. In conventional rotary engines, centrifugal force is employed to maintain the pistons out against the cam. Centrifugal force alone is not enough to overcome the vacuum effect when the pistons are required to suck in their charge of air in the conventional manner. In this engine, the blower or air pump is used to charge the cylinders which forces the air into the cylinders under pressure so that rather than a vacuum which retards the outward movement of the pistons, a pressure is provided which adds to the centrifugal force to move the pistons out against the cam. The air pressure against the pistons insures that the rollers on the pistons will follow the cam as well as provide a supercharging effect.

The air fed to the inerior of the cylinder is then compressed at the roller on the piston approaches 224 on the cam surface. The piston is moved inwardly into the cylinder thereby closing the openings 182 so that the air in the cylinder can be compressed. The air is compressed and the fuel is sprayed into the cylinder when the jets 118 and 120 register with ports 237 to cause the ignition thereof as previously described.

An extremely important feature of this invention is the fact that vibration problems are greatly reduced. In a conventional crank engine, the reciprocating pistons and other reciprocating parts all tend to cause vibration. The vibration problem is substantially reduced due to the fact that two diametrically opposing pistons are moving in opposite directions at all times. Because there are two lobes on the cam, a complete cycle of operation is obtained twice in every revolution in each of the pistons. Furthermore, the mounting of the pistons diametrically opposite each other, and firing them together, causes one to neutralize the other in a way that a couple-type force is applied to the rotor so that the load on the bearings of the rotor is minimized. Additionally, the firing force against the piston is taken directly by, and in line with, the cam so that all of the forces of explosions are concentrated in the cam, which is the one member most capable of withstanding such forces. The combustion forces in the cylinder cause the cylinders to urge the rotor member 138 inwardly into sealing engagement with the stationary core member 34 to provide a positive seal.

Thus, it can be seen that the rotary internal combustion of this invention involves an unique method to cool the cylinders thereof by introducing cool air to the interior thereof over a substantial portion of the engine cycle, thus resulting in a much improved engine of greater efficiency. It can also be seen that a novel means has been provided for achieving maximum combustion efficiency by providing a slight dwell area behind top dead center on the cam lobes. The air fed through the cylinders not only cools the cylinders but aids in forcing the pistons out against the cam plate. Thus it can be seen that a rotary combustion engine has been provided which accomplishes at least all of its stated objectives.

I claim:

1. The method of cooling a internal combustion enging having a frame means, an output shaft, a plurality of cylinders each having a reciprocating piston operatively secured to said output shaft, comprising,
    introducing combustible fuel into said cylinders and combusting said fuel to force said pistons to move through an expansion stroke in said cylinders,
    and introducing ambient air directly into said cylinders for a period of time greater than the time period consumed by the power portion of the expansion stroke of said pistons after combustion of said fuel to purge the exhaust gases resulting from combustion, to recharge said cylinders with fuel, and to cool the pistons and the ineriors of said cylinders.

2. The method of causing reciprocating pistons in a rotary cam type internal combustion engine to move outwardly into engagement with the cam plate means extending therearound, comprising the following steps:
    introducing combustible fuel into the cylinders in which said pistons are reciprocatably mounted and combusting said fuel to force said pistons to move through an expansion stroke in said cylinders,
    forcing ambient air through said cylinders after combustion of said fuel for a greater period of time than the period of time consumed by the power portion of the expansion stroke of said pistons to purge the exhaust gases resulting from combustion,
    introducing air under pressure into said cylinders to force said pistons outwardly into engagement with said cam plate means, to cool the interior of said cylinders, and to provide air for charging the cylinders for subsequent mixture with a combustible fuel.

* * * * *